March 19, 1957   F. G. BACK   2,785,600
TARGET PLOTTING PROJECTOR UNIT DEVICE
Filed March 30, 1955   3 Sheets-Sheet 1

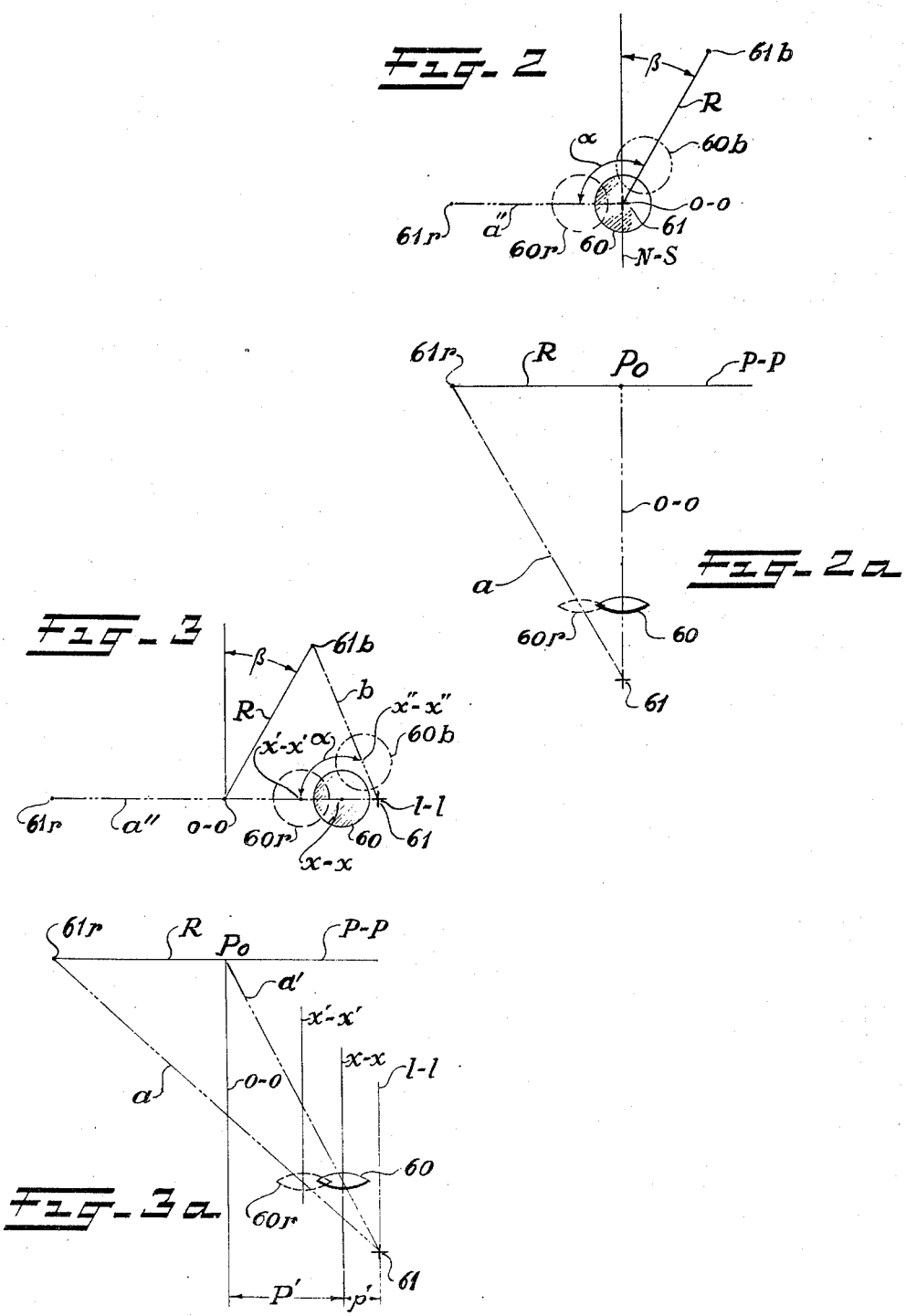

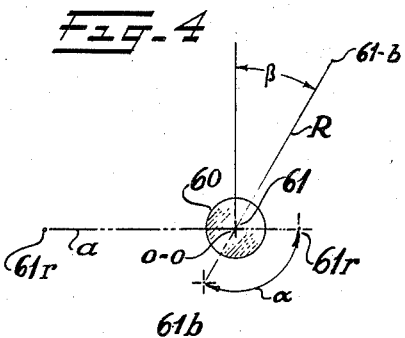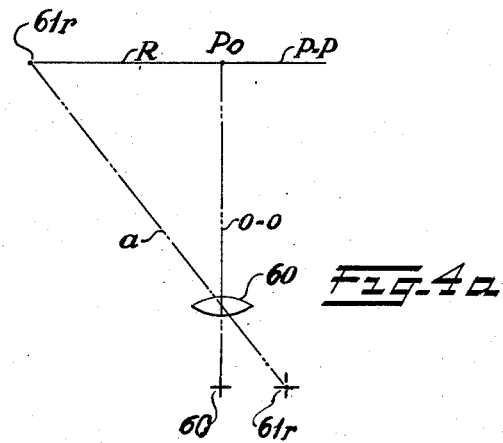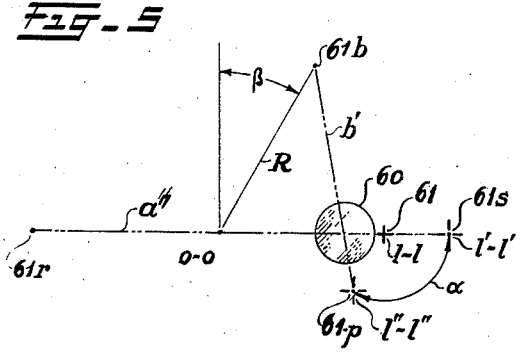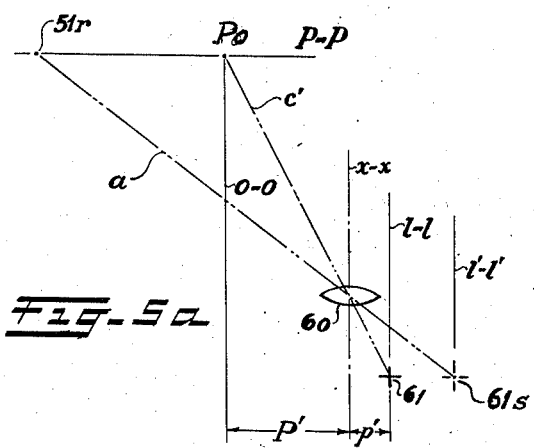

United States Patent Office 2,785,600
Patented Mar. 19, 1957

2,785,600

TARGET PLOTTING PROJECTOR UNIT DEVICE

Frank G. Back, Glen Cove, N. Y.

Application March 30, 1955, Serial No. 498,013

3 Claims. (Cl. 88—24)

Target plotting projectors are in common use for naval, military, civil defense and aviation purposes and also serve as instruction and training equipment.

Their function is commonly to indicate the position of a specific object or target relative to either the observer or relative to another object. Changes in the position of the target are shown by the projector, in such manner that not only the position but also the movement of the target, relative to the arbitrarily chosen point of reference, is continuously recorded.

These target plotting projectors of conventional design and construction, have a number of disadvantages, for instance:

A computer must be employed in conjunction with the unit to calculate the tilt angle for each "target image" location because there exists no linear relation between the data-feed and the projector-movement.

A further non-linearity is introduced and a second reason for the computer in conventional units, becomes obvious if the target projector is located eccentric of the zero point.

In the design and construction of projectors, according to the present invention, the necessity for the use of a computer is eliminated because the target projection means move in a plane parallel to the projection plane and do not tilt, thus there exists a linear relationship between the movement of the target and the target range is projected.

For the same reason the shape of the target and its projected image remain similar and the image does not become elongated. Furthermore, in the present invention there are provisions to compensate for parallax.

The tilting of the projector, in the conventional arrangements, affects the shape, size and sharpness of the projected target-image, causing it to appear elongated, out of focus and of changing size. This also affects the exactness of the plotting information.

The image of the target appears elongated in conventional construction because the projector had to be tilted to project target-locations. Through the tilting the optical axis of the projection lens is no longer perpendicular to the projection plane and furthermore the projecting plane is no longer parallel to the object plane.

In conventional systems, the distance between the projection lens system and projection-plane changes, while the distance between the projection lens system and the light source remains the same. This means that the ratio between the two conjugates of the projection lens system changes during a plotting operation the long conjugates varying and the short conjugates remaining constant, and thus causes the magnification of the target image to vary, during a plotting operation.

In systems, constructed in accordance with the present invention, the ratio between the conjugates of the projection lens system remains constant and thus the image magnification remains also constant. This fixed ratio between the two conjugates and thus the fixed image magnification is maintained in the systems of the present invention regardless whether, for the purposes of plotting either the projection lens system is moved with respect to the target or the target is moved with respect to the projection lens system. For the same reason the target remains always in sharp focus.

It is an object of the present invention to provide a new design and construction for target plotting projectors which effectively overcomes all the defects and disadvantages of conventional devices of this type.

Other and further objects of the present invention will be obvious and apparent in the light of the detailed description and drawings setting forth a preferred embodiment of the present invention which is especially useful for plotting in polar-coordinates.

It will be understood that for the purpose of adequate description and illustration, one preferred form of the present invention is set forth, without thereby limiting the scope of the invention except as the same be limited by the prior art and the scope of the appended claims.

The principles involved in the present invention are illustrated schematically and furthermore one preferred form thereof, is shown in the drawings in which:

Figures 2, 3, 4 and 5, represent schematic top-plan views and Figures 2a, 3a, 4a and 5a, represent front-elevational views corresponding to these schematic top-plan views, illustrating the movement of the target plotting projector components the relative positions and interrelation between these components, for meeting the various conditions as prescribed by the target data furnished.

Figures 1, 1A:
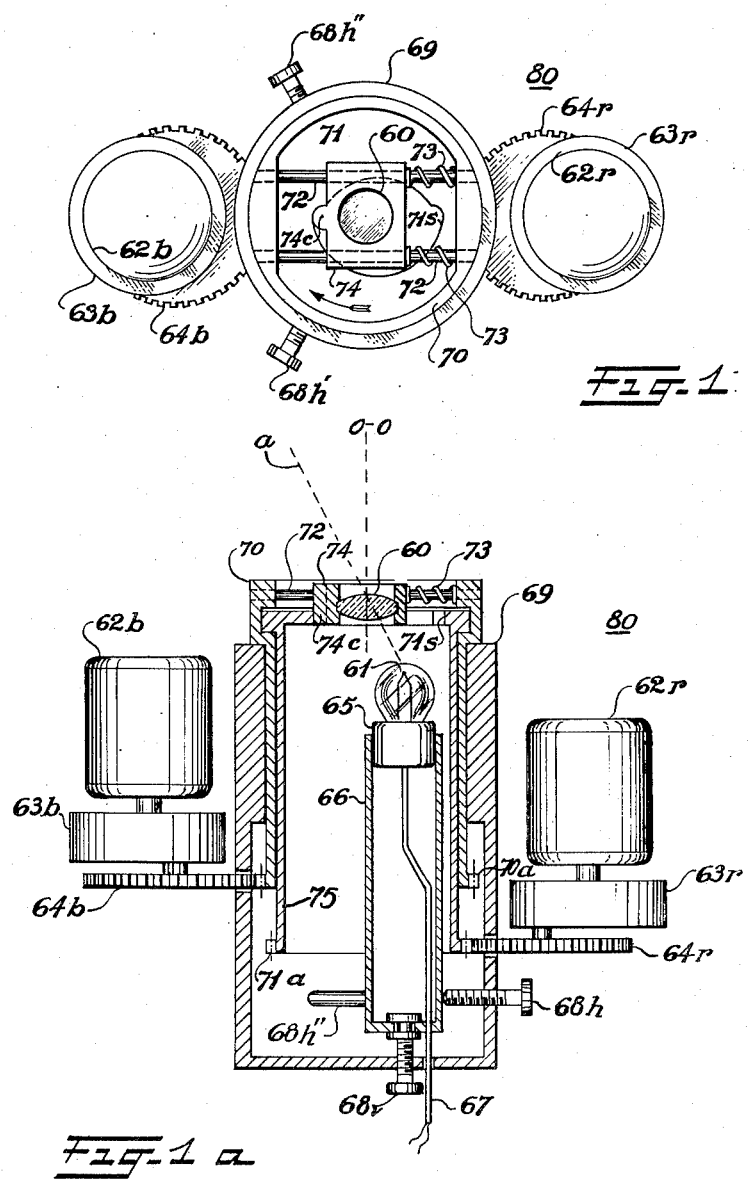
Figures 1 and 1a illustrate, each, diagrammatically, a top-plan view and a front elevational view in cross section, of one preferred form of the present invention; its operation, function and use, when incorporated into a conventional target plotting table.

Referring now solely to Figures 2, 2a; 3, 3a; 4, 4a; 5 and 5a, it will be seen that for the purpose of indicating both the range and the bearing of an object the projection lens 60 moves while the point light source 61, the projected image of which represents the target remains fixed and alternatively as in Figures 4, 4a, 5, 5a, the light source moves while the projection lens 60 remains fixed.

With specific reference to Figures 2 and 2a, it will be noted that the projection lens 60 is in a position in which the light source 61 lies on the optical axis, the intersection of the optical axis, in this position with the projection plane defines the zero point $P_0$ on the projection plane.

With particular reference to Figure 2a, note that in order to represent a certain range R, the lens 60 is moved parallel to the projection plane to occupy the position 60r, to project the target 61 by means of the light ray (a) on the projection plane as target image 61r. In order to represent the bearing beta (B), which represents the angle between a set reference line N–S and the range R (note particularly Figure 2), the lens 60 is moved from position 60r by angular rotation around the axis 0—0, and the position 61 into the proper position 61b to indicate both the range and the bearing for a target plotted.

Having reference to Figures 3 and 3a, it will be noted that the basic principle underlying the illustrated function in Figures 3 and 3a is similar to the function illustrated in Figures 2 and 2a to the extent that the proper projection is accomplished by the movement of the projection lens 60 with respect to the fixed light source 61. Whereas in Figures 2 and 2a the target position is such that the normal from the light source 61 to the projector plane P—P (hereinafter called the light source axis) coincides with the optical axis in the zero position of lens $P_0$, the intersection of the light source axis $l$—$l$ in Figures 3 and 3a does not coincide with the zero point $P_0$ on the projection plane P—P. Accordingly, to project the target 61 into the zero point $P_0$, the lens 60 occupies a position where its axis $x$—$x$ (hereinafter referred to as the axis of rotation) is parallel to but not identical with the light source axis $l$—$l$. The traget 61 is projected by light ray $a'$ in the zero point. The lateral $p'$ between the parallel axis $x$—$x$ and $l$—$l$ constitutes the correction for parallax which is caused by the eccentric position of the projector with respect to the zero point $P_0$. In order to represent a range, the lens 60 is moved in a plane parallel to the projection plane into the position $60r$, its optical axis is thus represented by the line $x'$—$x'$. The target is imaged by ray $(a)$ in the projection plane P—P, at $61r$.

In order to project the target 61 into its final position $61b$, the lens at position $60r$ is rotated around the axis of rotation $x$—$x$ through angle alpha ($\alpha$) into position $60b$.

In Figures 4, 4a, 5 and 5a, conditions corresponding to the conditions respectively illustrated in Figures 2, 2a, and 3, 3a, are shown except that in Figures 4, 4a, 5, 5a, the lens 60 remains fixed and the light source 61 is being moved, whereas in Figures 2, 2a, 3 and 3a, the lens 60 is moved and the light source 61 remains fixed.

Having now reference to Figures 1 and 1a, the target plotting projector 80 consists in combination of the main housing 69, the motor $62b$ and the differential motor $62r$, associated therewith. The pin-point light source 61 is positioned in the main housing 69 by means of a removable smaller housing 66 which retains the bulb socket 65 connected to the wire 67 and which is adjustable by means of screws $68h$, $68h'$, $68h''$ horizontally and by means of screw $68v$ vertically. The intermediate housing 70 is provided at the top thereof with parallel rods 72 upon which the lens retaining holder 74 moves, being held in position by the springs 73 against the cam opening $71s$ and containing the projection lens 60. The electric motors $62b$ and $62r$ connected to the gear box $63b$ and $63r$, respectively, transmit by means of gears $64r$ and $64b$, respectively a rotational motion to the inner housing 75 through gear $70a$ and to the intermediate housing 70 through gear $71a$. The movement of inner housing 75 rotates the cam 71 for the range indicated and the housing 70 for the purpose of a bearing indication. The cam 71 is provided with the opening $71s$ so shaped as to establish a linear relationship between the motion of the lens 60 upon the rods 72 which also correspond in a linear relation to the rotational motion of housing 70 caused by motor $62r$. The movement of the bearing rotation and the range movement can be performed concurrently by means of this mechanism. When the cam 71 actuates the lens retaining means 74 to move on the rods 72 at the same time the unit of the housing 70 may be rotated to the extent desired.

Having set forth my invention and what I desire to secure by Letters Patent, I claim:

1. In a target plotting projector, a projector unit consisting of a housing, a pin point light source in said housing, a projection lens carried by the housing, mechanical means connected to the projector unit to vary the relative axial positions of the lens and the light source and a projection surface to receive light coming from the projector unit wherein said light source remains in the object plane of the projection lens and the optical axis of said lens remains perpendicular to the image plane, represented by the projection surface, said lens being adapted to project the pin point of light from the light source onto said projection surface to indicate a target movement and position continuously, the movement and variation of position of the target image in a plane normal to the lens axis being accomplished by motion imparted with said mechanical means to said lens means in conformance with data fed thereto.

2. In a target plotting projector, a projector unit consisting of a housing, a pin point light source in said housing, a projection lens carried by the housing, mechanical means connected to the projector unit to vary the position of the light source with respect to the lens and a projection surface to receive light coming from the projector unit wherein said light source remains in the object plane of the projection lens and the optical axis of said lens remains perpendicular to the image plane, represented by the projection surface, said lens being adapted to project the pin point of light from the light source onto said projection surface to indicate a target movement and position continuously, the movement and variation of position of the target image in a plane normal to the lens axis being accomplished by motion imparted with said mechanical means to said light source in conformance with data fed thereto.

3. In a target plotting projector, in accordance with claim 1, means to adjust the point light source, so as to off-set the target-axis against the optical axis of the lens means to compensate for projection parallax, while the projector is in the zero-position.

References Cited in the file of this patent

UNITED STATES PATENTS

| | | |
|---|---|---|
| 2,116,217 | Schwarz | May 3, 1938 |
| 2,214,682 | Spacher | Sept. 10, 1940 |
| 2,244,523 | Hess | June 3, 1941 |
| 2,420,316 | Hine | May 13, 1947 |
| 2,421,077 | Miller | May 27, 1947 |
| 2,423,513 | Meyer | July 8, 1947 |
| 2,448,568 | Zwillinger et al. | Sept. 7, 1948 |
| 2,584,267 | Hayek | Feb. 5, 1952 |
| 2,608,094 | Best | Aug. 26, 1952 |
| 2,714,330 | Frederickson | Aug. 2, 1955 |

FOREIGN PATENTS

| | | |
|---|---|---|
| 303,317 | Germany | Nov. 8, 1918 |